United States Patent
Tien et al.

(10) Patent No.: US 10,726,124 B2
(45) Date of Patent: Jul. 28, 2020

(54) COMPUTER DEVICE AND METHOD OF IDENTIFYING WHETHER CONTAINER BEHAVIOR THEREOF IS ABNORMAL

(71) Applicant: Institute For Information Industry, Taipei (TW)

(72) Inventors: Chia-Wei Tien, Taichung (TW); Tse-Yung Huang, New Taipei (TW); Chin-Wei Tien, Taipei (TW)

(73) Assignee: Institute For Information Industry, Taipei (TW)

( * ) Notice: Subject to any disclaimer, the term of this patent is extended or adjusted under 35 U.S.C. 154(b) by 246 days.

(21) Appl. No.: 15/835,426

(22) Filed: Dec. 7, 2017

(65) Prior Publication Data

US 2019/0163901 A1    May 30, 2019

(30) Foreign Application Priority Data

Nov. 29, 2017 (TW) .............................. 106141607 A

(51) Int. Cl.
*G06F 21/55* (2013.01)
*G06N 20/00* (2019.01)
(Continued)

(52) U.S. Cl.
CPC ............ *G06F 21/552* (2013.01); *G06F 21/55* (2013.01); *G06F 21/56* (2013.01); *G06F 21/564* (2013.01);
(Continued)

(58) Field of Classification Search
CPC .... G06F 21/552; G06F 21/564; G06F 21/566; G06F 21/56; G06F 21/55; G06F 21/53;
(Continued)

(56) References Cited

U.S. PATENT DOCUMENTS 9,507,935 B2 * 11/2016 Ismael .................. G06F 21/552
2007/0006325 A1    1/2007 Gargaro
(Continued)

FOREIGN PATENT DOCUMENTS

TW    200710673 A    3/2007
TW    201738798 A    11/2017

OTHER PUBLICATIONS

Office Action to the corresponding Taiwan Patent Application rendered by the Taiwan Intellectual Property Office (TIPO) dated Sep. 11, 2018, 21 pages.

*Primary Examiner* — Huan V Doan
(74) *Attorney, Agent, or Firm* — Skaar Ulbrich Macari, P.A.

(57) ABSTRACT

A computer device and a method of identifying whether container behavior thereof is abnormal are provided. The computer device detects container behavior of a container in a time interval, and identifies whether the container behavior of the container is abnormal according to a container behavior identification module, thereby determining whether there is an intrusion. In addition, a decoy container can be installed in the computer device to attract attacking or invading from a third party so as to reduce the risk of the container being attacked, and the container behavior identification module can be updated according to the container behavior of the decoy container.

6 Claims, 6 Drawing Sheets

(51) Int. Cl.
  *G06F 21/56* (2013.01)
  *G06F 9/455* (2018.01)
  *G06F 21/53* (2013.01)

(52) U.S. Cl.
  CPC ........... *G06F 21/566* (2013.01); *G06N 20/00* (2019.01); *G06F 21/53* (2013.01); *G06F 2009/45587* (2013.01); *G06F 2221/033* (2013.01); *G06F 2221/2123* (2013.01)

(58) Field of Classification Search
  CPC ... G06F 2009/45587; G06F 2221/2123; G06F 2221/033; G06N 20/00; G06N 20/10; G06N 5/003
  See application file for complete search history.

(56) References Cited

U.S. PATENT DOCUMENTS

| | | | |
|---|---|---|---|
| 2011/0321166 A1* | 12/2011 | Capalik | H04L 63/1491 726/25 |
| 2015/0295945 A1* | 10/2015 | Canzanese, Jr. | G06F 9/45545 726/23 |
| 2016/0080415 A1 | 3/2016 | Wu et al. | |
| 2016/0092682 A1* | 3/2016 | Adams | G06F 21/56 726/23 |
| 2016/0149950 A1* | 5/2016 | Ashley | G06F 21/554 726/23 |
| 2016/0359695 A1* | 12/2016 | Yadav | H04L 43/04 |
| 2017/0116415 A1 | 4/2017 | Stopel et al. | |
| 2017/0308701 A1 | 10/2017 | Nandha Premnath et al. | |
| 2018/0115523 A1* | 4/2018 | Subbarayan | G06F 21/55 |
| 2018/0159879 A1* | 6/2018 | Mestha | H04L 63/1425 |
| 2018/0309787 A1* | 10/2018 | Evron | G06F 21/121 |

* cited by examiner

COMPUTER DEVICE AND METHOD OF IDENTIFYING WHETHER CONTAINER BEHAVIOR THEREOF IS ABNORMAL

PRIORITY

This application claims priority to Taiwan Patent Application No. 106141607 filed on Nov. 29, 2017, which is hereby incorporated by reference in its entirety.

FIELD

The present invention relates to a computer device and an intrusion detection method. More particularly, the present invention relates to a computer device and a method of identifying whether container behavior thereof is abnormal.

BACKGROUND

Container is a virtual machine technology sharing an operating system. In detail, a container engine may provide an isolated environment for each container so that each container seems to operate on an independent operating system but is capable of sharing bottom resources. Container technology has found wide application in recent years due to characteristics thereof such as a lightweight, a high extensibility and a high flexibility or the like.

With the popularity of the container technology, the frequency of attack or intrusion to the container from third parties is increasing gradually, and these behaviors rise various problems to the security of the container. For example, a third party may initiate the following attacking or intruding behaviors: attacking or intruding upon a host so as to control the operation of the container within the host; attacking or intruding upon a certain container and using the container as a springboard to control the operation of other containers or the host. Accordingly, an urgent need exists in the art to effectively detect the attack or intrusion to the container from the third party.

SUMMARY

To solve the aforesaid problem, some disclosed embodiments provide a computer device. The computer device may comprise a storage and a processor electrically connected with the storage. The storage may be configured to store a container behavior identification module, and the processor may be configured to detect container behavior of a container in a time interval and determine whether the container behavior is abnormal according to the container behavior identification module.

To solve the aforesaid problem, some disclosed embodiments provide a method of identifying whether container behavior is abnormal. The method may comprise the following steps: detecting, by a computer device, container behavior of a container in a time interval; and determining, by the computer device, whether the container behavior is abnormal according to a container behavior identification module.

The container behavior of a container usually varies when the container is subjected to attack or intrusion from a third party. Therefore, in the embodiments of the present invention, it can be effectively detected whether the container is subjected to the attack or intrusion from the third party by identifying whether the container behavior is abnormal.

This summary is not intended to limit the present invention but is provided only to overall describe the core concept of the present invention and cover the technical problem to be solved, the technical means to solve the problem and the technical effect of the present invention to provide a basic understanding of the present invention by those of ordinary skill in the art. The present invention can be further understood by those of ordinary skill in the art according to embodiments provided in the attached drawings and following implementations.

DETAILED DESCRIPTION

In the following description, the present invention will be explained with reference to certain example embodiments thereof. However, these example embodiments are not intended to limit the present invention to any specific examples, embodiments, operations, environment, applications, structures, processes or steps described in these example embodiments.

In the attached drawings, elements unrelated to the present invention are omitted from depiction; and dimensional relationships among individual elements in the attached drawings are only for ease of description but not intended to limit the actual scale of the present invention. Unless stated particularly, same (or similar) element symbols may correspond to same (or similar) elements in the following description.

Figure 1:
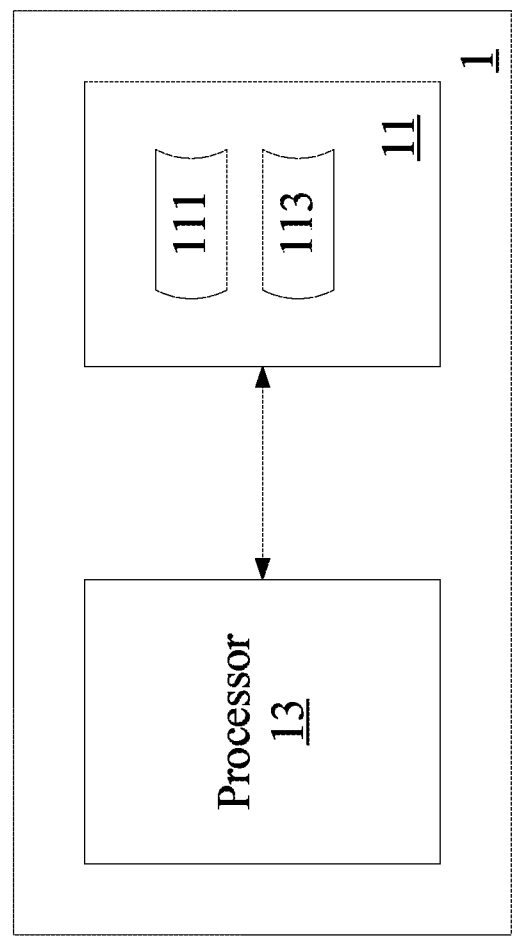
FIG. 1 illustrates a computer device in some embodiments of the present invention.

FIG. 1 illustrates a computer device 1 in some embodiments of the present invention. Contents shown in FIG. 1 are only for purpose of illustrating embodiments of the present invention instead of limiting the present invention.

Referring to FIG. 1, the computer device 1 may comprise a storage 11 and a processor 13 electrically connected with the storage 11. In addition to the storage 11 and the processor 13, the computer device 1 may further comprise other elements in some embodiments which are for example but not limited to an input element, an output element, a networking element or the like. All elements comprised in the computer device 1 are connected together, and the connection between any two of the elements may be direct connection (i.e., connection not via other functional elements) or indirect connection (i.e., connection via other functional elements). The computer device 1 may be one of various computing devices capable of computing, storing, communicating, and/or networking, and these computing devices are for example but not limited to: a desktop computer, a portable computer, a mobile phone or the like.

The processor 13 may comprise a microprocessor or a microcontroller for executing various operational programs in the computer device 1. The microprocessor or the microcontroller is a programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results.

The storage 11 may comprise a primary memory (which is also called a main memory or an internal memory), and the processor 13 may directly read instruction sets stored in the primary memory and execute these instruction sets if needed. The storage 11 may further comprise a secondary memory (which is also called an external memory or an auxiliary memory), and the secondary memory may use a data buffer to transmit data stored to the primary memory. For example, the secondary memory may be but not limited to a hard disk, an optical disk or the like. The storage 11 may also comprise a third-level memory, i.e., a storage device that can be inserted into or pulled out from a computer directly, e.g., a mobile disk.

The storage 11 may be configured to store a container behavior identification module 111, and the processor 13 may be configured to detect container behavior of each container built in the computer device 1 in a time interval (or every other time interval) and determine whether the container behavior is abnormal according to the container behavior identification module, thereby determining whether the container is subjected to attack or intrusion.

In some embodiments, the storage 11 may be further configured to store a container raw log 113, and the container raw log 113 may be configured to record data and hardware information relevant to all events occurring to each container within the computer device 1. Event types recorded in the container raw log 113 may include but not limited to: writing (e.g., an event type of open or openat, with a parameter of write), reading (e.g., an event type of open or openat, with a parameter of read), accessing a database (e.g., an event type of sendto or red/from, with a port number as the preset value of the database), issuing a termination signal (e.g., an event type of kill), waiting (e.g., an event type of select or polling), receiving external connection (e.g., an event type of accept), accessing a memory (e.g., an event type of brk, mmap or munmap), establishing connection (e.g., an event type of connect), generating a new thread (e.g., an event type of clone), performing network behavior (e.g., an event content comprising GET or POST, an event type of sendto, with a port number of 8080, 80, 8443 or 443), creating a catalog (e.g., an event type of mkdir), changing a catalog (e.g., an event type of chdir), executing a new program (e.g., an event type of exec) or the like. Types of the hardware information recorded in the container raw log 113 may comprise but not limited to: the utilization ratio of a central processing unit, the utilization amount of a memory, the utilization amount of a hard disk, the utilization amount of a network or the like.

The processor 13 may detect the container behavior of each container in a time interval (or every time interval) according to the contents of the container raw log 113 and calculate a target behavior eigenvector for the container behavior. For example, according to the contents of the container raw log 113, the processor 13 may define all events occurring to each container in a time interval (for example but not limited to: 5 seconds, 10 seconds, 20 seconds, 1 minute, 5 minutes, 1 hour or 3 hours) as the container behavior of the container, and combine data and/or hardware information relevant to these events into a target behavior eigenvector. Then, the processor 13 may classify the target behavior eigenvector according to the container behavior identification module 111. If the target behavior eigenvector is classified as abnormal (which is equivalent to that the container behavior is abnormal), then the processor 13 identifies that the container has been subjected to attack or intrusion. If the target behavior eigenvector is classified as normal (which is equivalent to that the container behavior is normal), then the processor 13 identifies that the container is not subjected to attack or intrusion. When it is identified that the container is subjected to attack or intrusion, the processor 13 may notify the user of the computer device 1 by images or sounds through various outputting elements (e.g., a display, a loudspeaker or the like).

The processor 13 may train a plurality of reference behavior eigenvectors through a machine learning training procedure (which is for example but not limited to: a Support Vector Machine (SVM) algorithm, a Decision Tree algorithm, a Depth Learning algorithm or the like) to create the container behavior identification module 111 stored in the storage 11, and wherein the reference behavior eigenvectors include at least one normal behavior eigenvector and at least one abnormal behavior eigenvector. For example, the normal behavior eigenvector may be the combination of data, which is relevant to all events occurring to one or more containers, recorded in the container raw log 113 or a container raw log stored in an external computer device in the case where the containers are not subjected to attack or intrusion (e.g., the number of writes being 6, the number of reads being 10 and the number of accessing database being 8). The abnormal behavior eigenvector may be the combination of data, which is relevant to all events occurring to one or more containers, recorded in the container raw log 113 or a container raw log stored in an external computer device in the case where the containers are subjected to attack or intrusion (e.g., the number of writes being 25, the number of reads being 75 and the number of accessing database being 80). In this exemplary example, the container is subjected to the buffer overflow attack, so the number of writes, the number of reads and the number of accessing database are increased abnormally in the abnormal behavior eigenvector. In some embodiments, the container behavior identification module 111 stored in the storage 11 may also be created in advance by an external computer device.

Figure 2A:
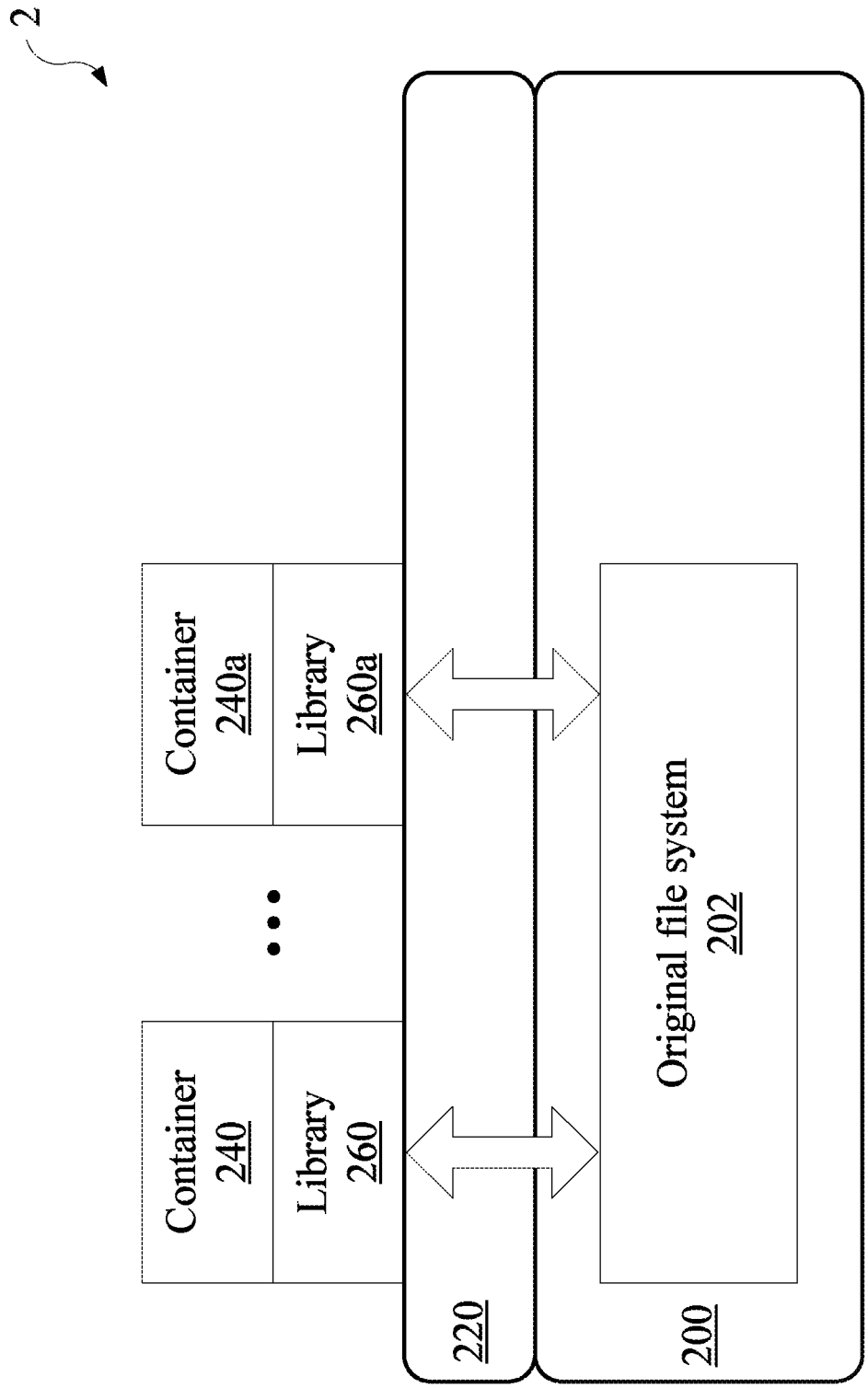
FIG. 2A illustrates a container status of the computer device shown in FIG. 1, in some embodiments of the present invention.
Figure 2B:
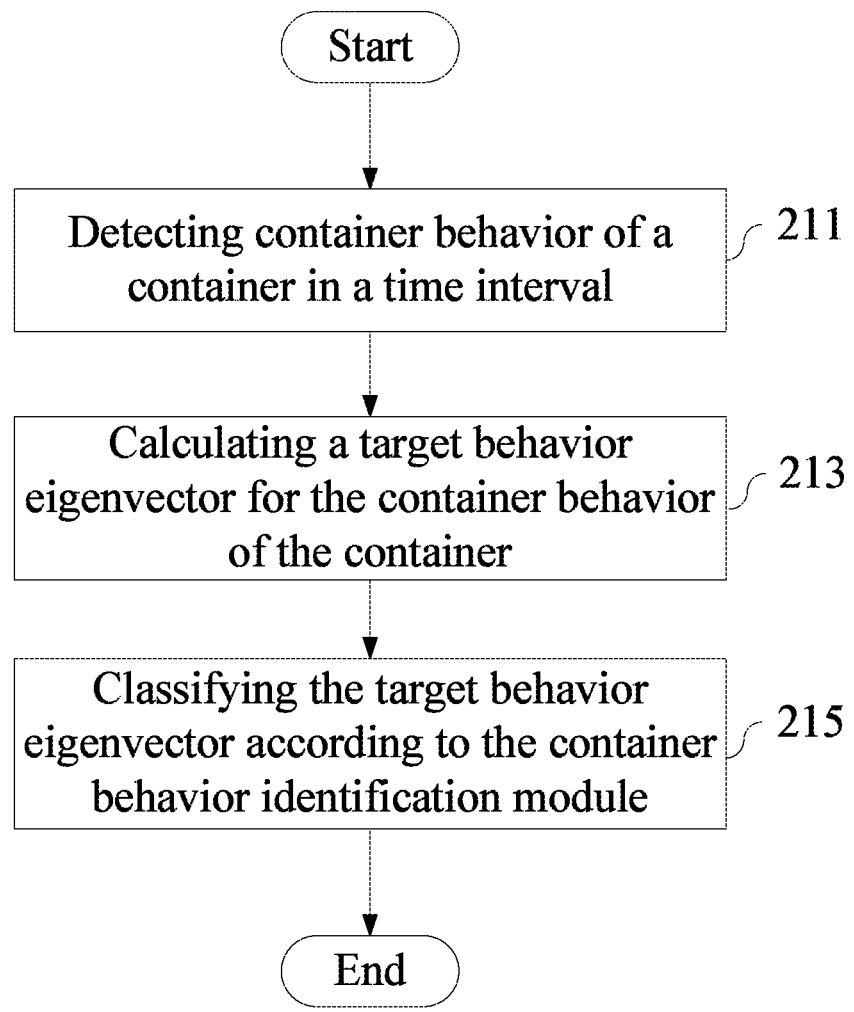
FIG. 2B illustrates how the computer device shown in FIG. 1 identifies container behavior under the container status shown in FIG. 2A, in some embodiments of the present invention.

FIG. 2A illustrates a container status 2 of the computer device 1 in some embodiments of the present invention, and FIG. 2B illustrates how the computer device 1 identifies container behavior under the container status 2 shown in FIG. 2A in some embodiments of the present invention. Contents shown in FIG. 2A to FIG. 2B are only for purpose of illustrating embodiments of the present invention instead of limiting the present invention.

As shown in FIG. 2A, the processor 13 may install a container engine 220 on an operating system 200, and may utilize the container engine 220 to create one or more containers 240 (including a container 240a) operating independently depending on different requirements. Depending on different requirements, the processor 13 may create a plurality of containers 240 with the same attribute/function for application programs to be loaded therein, and it may also create a plurality of containers 240 with different attributes/functions for the application programs to be loaded therein. Depending on different requirements, the processor 13 may specify an independent library 260 for each of the containers 240 (e.g., specify a library 260a for the container 240a) or specify the same library 260 for a plurality of containers 240 (e.g., specify a library 260 for a plurality of containers 240). Each of the containers 240 may access an original file system 202 within the operating system 200. It shall be appreciated that, the number of containers 240 shown in FIG. 2A is not for the purpose of limitation. Additionally, basic operation of the operating system 200, the container engine 220 and the container 240 has been understood by those of ordinary skill in the art, and thus will not be further described herein.

Referring to FIG. 2A to FIG. 2B, the processor 13 may perform the following processing on each of the containers 240 (taking the container 240a as an example): detecting container behavior of the container 240a in a time interval (or every other time interval) according the contents of the container raw log 113 (labeled as 211); calculating a target behavior eigenvector for the container behavior of the container 240a (labeled as 213); and classifying the target behavior eigenvector according to the container behavior identification module 111 (labeled as 215) to identify whether the container behavior of the container 240a is abnormal. Through the aforesaid processing, the processor 13 can identify whether the container 240a is subjected to attack or intrusion.

In some implementations, the computer device 1 and other computer devices may be connected to a central control center via various networks, and the central control center controls the aforesaid operation of the computer device 1. Moreover, when the computer device 1 identifies that the container is abnormal, the computer device 1 can notify the central control center immediately.

Figure 3A:
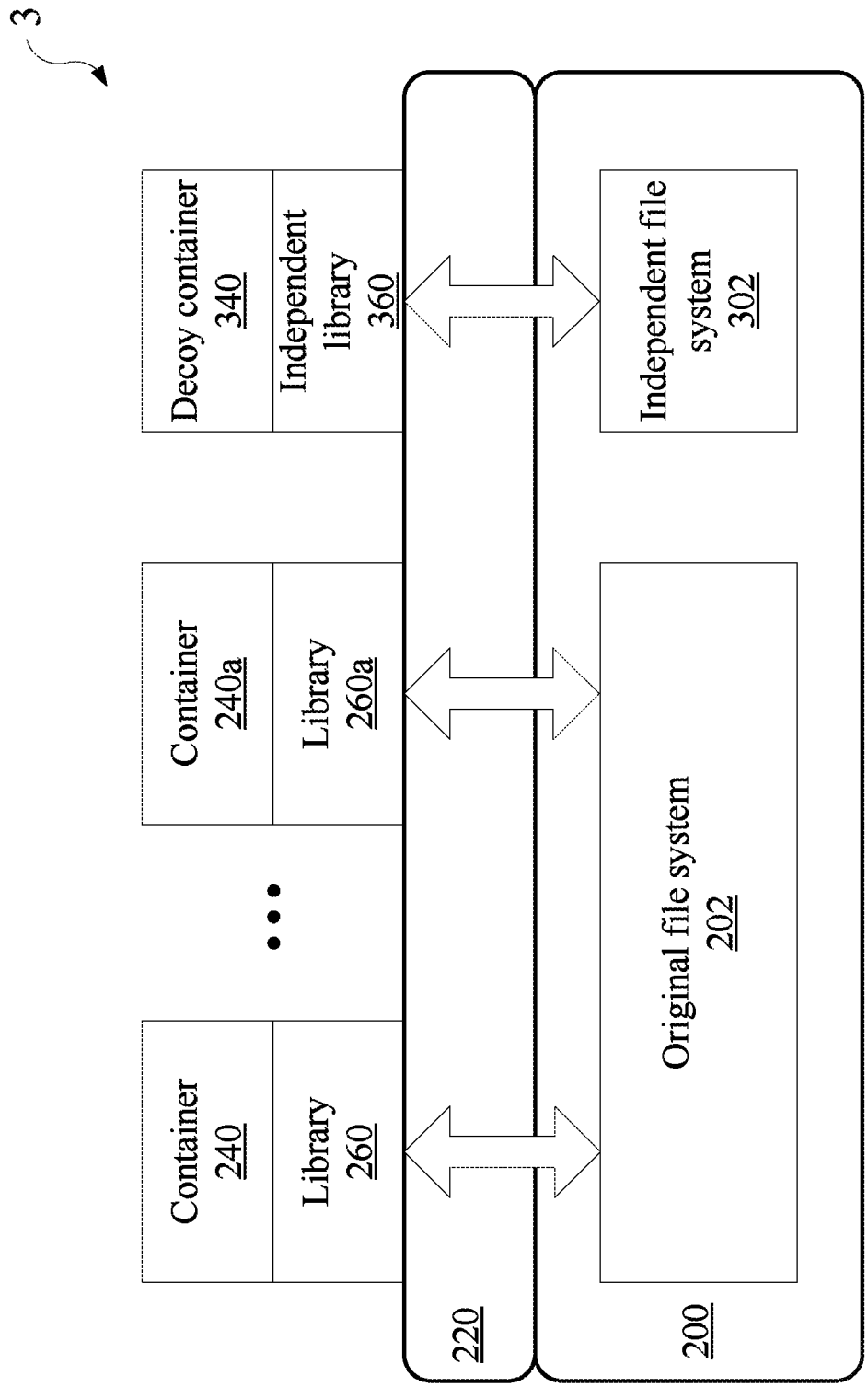
FIG. 3A illustrates another container status of the computer device shown in FIG. 1, in some embodiments of the present invention.
Figure 3B:
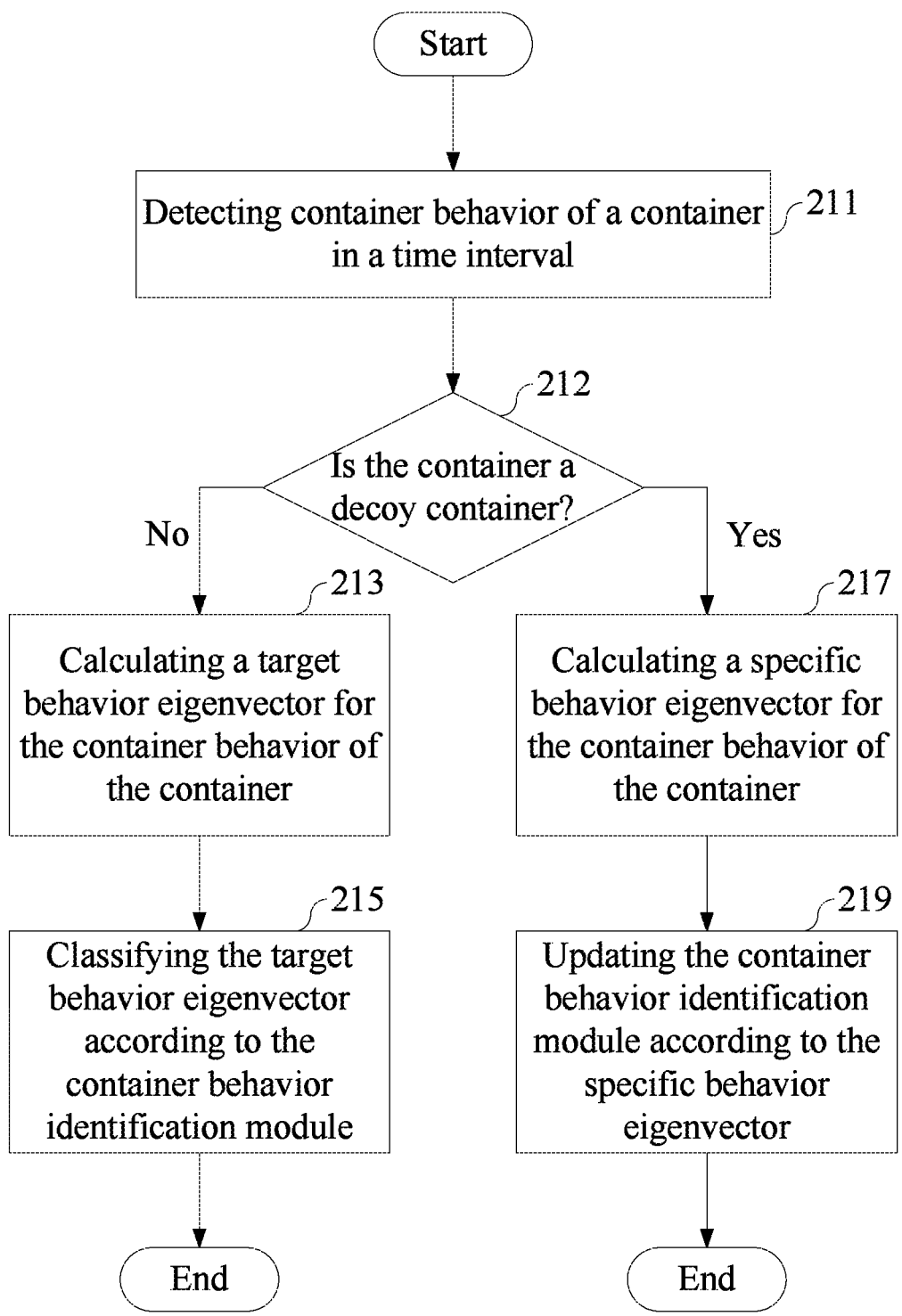
FIG. 3B illustrates how the computer device shown in FIG. 1 identifies the container behavior under the container status shown in FIG. 3A, in some embodiments of the present invention.

FIG. 3A illustrates another container status 3 of the computer device 1 in some embodiments of the present invention, and FIG. 3B illustrates how the computer device 1 identifies the container behavior under the container status 3 shown in FIG. 3A in some embodiments of the present invention. Contents shown in FIG. 3A to FIG. 3B are only for purpose of illustrating embodiments of the present invention instead of limiting the present invention.

In the container status 3 shown in FIG. 3, the computer device 1 additionally creates one or more corresponding decoy containers 340 in addition to the one or more containers 240, as compared to the container status 2 shown in FIG. 2A. In detail, each time the processor 13 has created a container 240, the processor 13 will automatically create a corresponding decoy container 340. For example, after creating the container 240a, the processor 13 may automatically analyze the attribute/function of the container 240a and automatically create a decoy container 340 of the same attribute/function as the container 240a. Then, the processor 13 may automatically implant one or more preset decoys to the decoy container 340 and/or add fake data into an independent file system 302 that is isolated from the original file system 202 via a decoy database (e.g., a Common Vulnerabilities and Exposures (CVE) database).

Implanting one or more preset decoys to the decoy container 340 helps to attract the third party to attack or intrude upon the decoy container 340, thereby preventing the third party from attacking or intruding upon the container 240a (i.e., the container that should be protected). For example, the processor 13 may analyze the version of the library 260a of the container 240a, and search for the previous version of the library 260a with vulnerabilities through the decoy database, and then specify the version with vulnerabilities as the independent library 360 of the decoy container 340, thereby attracting the attack or intrusion from the third party. Because the independent library 360 is isolated from other libraries (i.e., the libraries 260 and 260a), the third party cannot attack or intrude upon other containers (i.e., the containers 240 and 240a) through the vulnerabilities of the independent library 360.

Adding fake data into the independent file system 302 that can be accessed by the decoy container 340 also helps to attract the third party to attack or intrude upon the decoy container 340, thereby preventing the third party from attacking or intruding upon the container 240a (i.e., the container that should be protected). The decoy container 340 can only access the independent file system 302 within the operating system 200, and the independent file system 302 is isolated from the original file system 202. Therefore, even if the third party has intruded upon the decoy container 340, the third party still cannot access the original file system 202 (i.e., the file system that should be protected) via the decoy container 340.

In some embodiments, when the container behavior from the decoy container 340 is detected by the processor 13, the processor 13 may further calculate a specific behavior eigenvector (belonging to the abnormal behavior eigenvector) for the container behavior, and update the container behavior identification module 111 according to the specific behavior eigenvector, thereby preventing the same or similar attack or intrusion in the future.

Referring to FIG. 3A to FIG. 3B, the processor 13 may perform the following processing on each of the containers (including the containers 240 and 240a and the decoy container 340): detecting container behavior of the container in a time interval (or every other time interval) according the contents of the container raw log 113 (labeled as 211); determining whether the container is a decoy container (labeled as 212); calculating a target behavior eigenvector for the container behavior of the container if it is determined that the container is not a decoy container (labeled as 213), and classifying the target behavior eigenvector according to the container behavior identification module 111 (labeled as 215) to identify whether the container behavior of the container is abnormal; and calculating a specific behavior eigenvector for the container behavior of the container if it is determined that the container is a decoy container (labeled as 217) and updating the container behavior identification module 111 according to the specific behavior eigenvector (labeled as 219).

Figure 4:
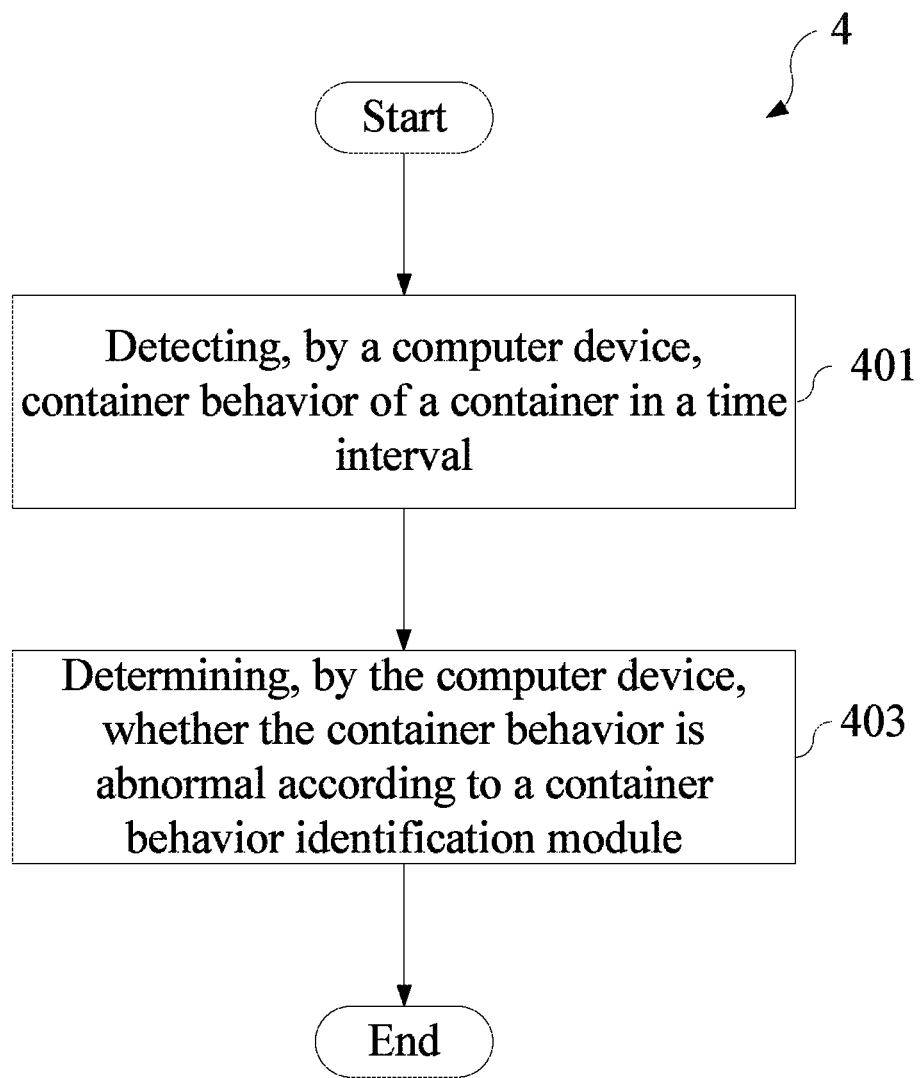
FIG. 4 illustrates a method of identifying whether the container behavior is abnormal, in some embodiments of the present invention.

FIG. 4 illustrates a method of identifying whether container behavior is abnormal in some embodiments of the present invention. Contents shown in FIG. 4 are only for purpose of illustrating embodiments of the present invention instead of limiting the present invention.

Referring to FIG. 4, a method 4 of identifying whether container behavior is abnormal may comprise the following steps: detecting, by a computer device, container behavior of a container in a time interval (labeled as 401); and determining, by the computer device, whether the container behavior is abnormal according to a container behavior identification module (labeled as 403).

In some embodiments, in addition to the steps 401 and 403, the method 4 may further comprise the following steps of: detecting, by the computer device, the container behavior of the container in the time interval according to a container raw log; calculating, by the computer device, a target behavior eigenvector for the container behavior; and classifying, by the computer device, the target behavior eigenvector according to the container behavior identification module to identify whether the container behavior is abnormal.

In some embodiments, in addition to the steps 401 and 403, the method 4 may further comprise the following step of: training, by the computer device, a plurality of reference behavior eigenvectors through a machine learning training procedure to create the container behavior identification module, wherein the reference behavior eigenvectors include at least one normal behavior eigenvector and at least one abnormal behavior eigenvector.

In some embodiments, in addition to the steps 401 and 403, the method 4 may further comprise the following step of: creating, by the computer device, a decoy container corresponding to the container on an independent file system; calculating, by the computer device, a specific behavior eigenvector for container behavior of the decoy container when the container behavior of the decoy container is detected; and updating, by the computer device, the container behavior identification module according to the specific behavior eigenvector. In these embodiments, the computer device may automatically create the decoy container after creating the container. In these embodiments, the step of creating the decoy container further comprises the following step: analyzing an attribute of the container and creating the decoy container according to the attribute and a preset decoy by the computer device.

In some embodiments, all of the aforesaid steps in the method 4 may be executed by the computer device 1. In some embodiments, in addition to the aforesaid steps, the method 4 may further comprise other steps corresponding to all the embodiments of the computer device 1 described above. These other steps of the method 4 shall be appreciated by those of ordinary skill in the art based on the above description of the computer device 1, and thus will not be further described herein.

The above disclosure is related to the detailed technical contents and inventive features thereof. Those of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A computer device, comprising:
  a storage, being configured to store a container behavior identification module; and
  a processor electrically connected to the storage, being configured to detect container behavior of a container in a time interval and determine whether the container behavior is abnormal according to the container behavior identification module;
  wherein the processor is further configured to analyze an attribute of the container, create a decoy container corresponding to the container on an independent file system according to the attribute and a preset decoy, calculate a specific behavior eigenvector for container behavior of the decoy container when the container behavior of the decoy container is detected, and update the container behavior identification module according to the specific behavior eigenvector; wherein the processor automatically creates the decoy container after creating the container.

2. The computer device of claim 1, wherein the storage is further configured to store a container raw log, and the processor is further configured to detect the container behavior of the container in the time interval according to the container raw log, calculate a target behavior eigenvector for the container behavior, and classify the target behavior eigenvector according to the container behavior identification module to identify whether the container behavior is abnormal.

3. The computer device of claim 1, wherein the processor is further configured to train a plurality of reference behavior eigenvectors through a machine learning training procedure to create the container behavior identification module, wherein the reference behavior eigenvectors include at least one normal behavior eigenvector and at least one abnormal behavior eigenvector.

4. A method of identifying whether container behavior is abnormal, comprising:
  detecting, by a computer device, container behavior of a container in a time interval;
  determining, by the computer device, whether the container behavior is abnormal according to a container behavior identification module;
  analyzing, by the computer device, an attribute of the container;
  creating, by the computer device, a decoy container corresponding to the container on an independent file system according to the attribute and a preset decoy, wherein the computer device automatically creates the decoy container after creating the container;
  calculating, by the computer device, a specific behavior eigenvector for container behavior of the decoy container when the container behavior of the decoy container is detected; and
  updating, by the computer device, the container behavior identification module according to the specific behavior eigenvector.

5. The method of claim 4, further comprising:
  detecting, by the computer device, the container behavior of the container in the time interval according to a container raw log;
  calculating, by the computer device, a target behavior eigenvector for the container behavior; and
  classifying, by the computer device, the target behavior eigenvector according to the container behavior identification module to identify whether the container behavior is abnormal.

6. The method of claim 4, further comprising:
  training, by the computer device, a plurality of reference behavior eigenvectors through a machine learning training procedure to create the container behavior identification module, wherein the reference behavior eigenvectors include at least one normal behavior eigenvector and at least one abnormal behavior eigenvector.

* * * * *